(12) United States Patent
Tall

(10) Patent No.: US 9,705,552 B1
(45) Date of Patent: Jul. 11, 2017

(54) SMART PHONE OR TABLET COMPUTER CASE WITH FINGER-ENGAGING SLOTS

(71) Applicant: Donald Tall, Hooper Bay, AK (US)

(72) Inventor: Donald Tall, Hooper Bay, AK (US)

( * ) Notice: Subject to any disclaimer, the term of this patent is extended or adjusted under 35 U.S.C. 154(b) by 0 days.

(21) Appl. No.: 15/181,484

(22) Filed: Jun. 14, 2016

(51) Int. Cl.
*H04M 1/00* (2006.01)
*H04B 1/3888* (2015.01)

(52) U.S. Cl.
CPC ................... *H04B 1/3888* (2013.01)

(58) Field of Classification Search
CPC .................................................. H04B 1/3888
USPC ....................................................... 455/575.6
See application file for complete search history.

(56) References Cited

U.S. PATENT DOCUMENTS

| | | | |
|---|---|---|---|
| 8,528,798 B2 | 9/2013 | Chen | |
| 8,579,112 B2 | 11/2013 | Bethea | |
| 8,622,447 B1 | 1/2014 | Wirtz | |
| 8,690,211 B2 | 4/2014 | Potter | |
| D711,866 S | 8/2014 | Kawata | |
| D713,140 S * | 9/2014 | Krupnick | D3/218 |
| 8,950,638 B2 | 2/2015 | Wangercyn, Jr. | |
| 9,033,384 B2 * | 5/2015 | Potter | A45F 5/10 |
| | | | 294/25 |
| 9,137,915 B2 * | 9/2015 | McCurdy | A45C 13/002 |
| 9,259,076 B2 * | 2/2016 | Gayler | G06F 1/1628 |
| 9,259,077 B2 * | 2/2016 | Murphy | A45F 5/00 |
| 9,486,910 B2 * | 11/2016 | Stevens | B25G 1/102 |
| 2010/0222118 A1 * | 9/2010 | Interdanato | H04B 1/385 |
| | | | 455/575.6 |
| 2012/0031937 A1 | 2/2012 | Baker | |
| 2013/0146625 A1 | 6/2013 | Karle | |
| 2015/0318885 A1 * | 11/2015 | Earle | H04B 1/385 |
| | | | 455/575.6 |

FOREIGN PATENT DOCUMENTS

CN 10167733 B 4/2012

* cited by examiner

*Primary Examiner* — April G Gonzales

(57) ABSTRACT

The smart phone or tablet computer case with finger-engaging slots is a glorified smart phone case that includes a pivoting armature on a rear surface. The pivoting armature rotates from a flattened positioned with the rear surface of the case to a perpendicular orientation. The pivoting armature features a pair of finger holes that are each adapted to receive a finger therein. The pivoting armature is adapted to be secured to the hand via the pair of finger holes in order to prevent dropping of the case.

7 Claims, 4 Drawing Sheets

SMART PHONE OR TABLET COMPUTER CASE WITH FINGER-ENGAGING SLOTS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of accessories that carrying electronic devices, more specifically, an case for an electronic device that includes a pivoting armature with finger-engaging slots.

SUMMARY OF INVENTION

The smart phone or tablet computer case with finger-engaging slots is a glorified smart phone case that includes a pivoting armature on a rear surface. The pivoting armature rotates from a flattened positioned with the rear surface of the case to a perpendicular orientation. The pivoting armature features a pair of finger holes that are each adapted to receive a finger therein. The pivoting armature is adapted to be secured to the hand via the pair of finger holes in order to prevent dropping of the case.

These together with additional objects, features and advantages of the smart phone or tablet computer case with finger-engaging slots will be readily apparent to those of ordinary skill in the art upon reading the following detailed description of the presently preferred, but nonetheless illustrative, embodiments when taken in conjunction with the accompanying drawings.

In this respect, before explaining the current embodiments of the smart phone or tablet computer case with finger-engaging slots in detail, it is to be understood that the smart phone or tablet computer case with finger-engaging slots is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the smart phone or tablet computer case with finger-engaging slots.

It is therefore important that the claims be regarded as including such equivalent construction insofar as they do not depart from the spirit and scope of the smart phone or tablet computer case with finger-engaging slots. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
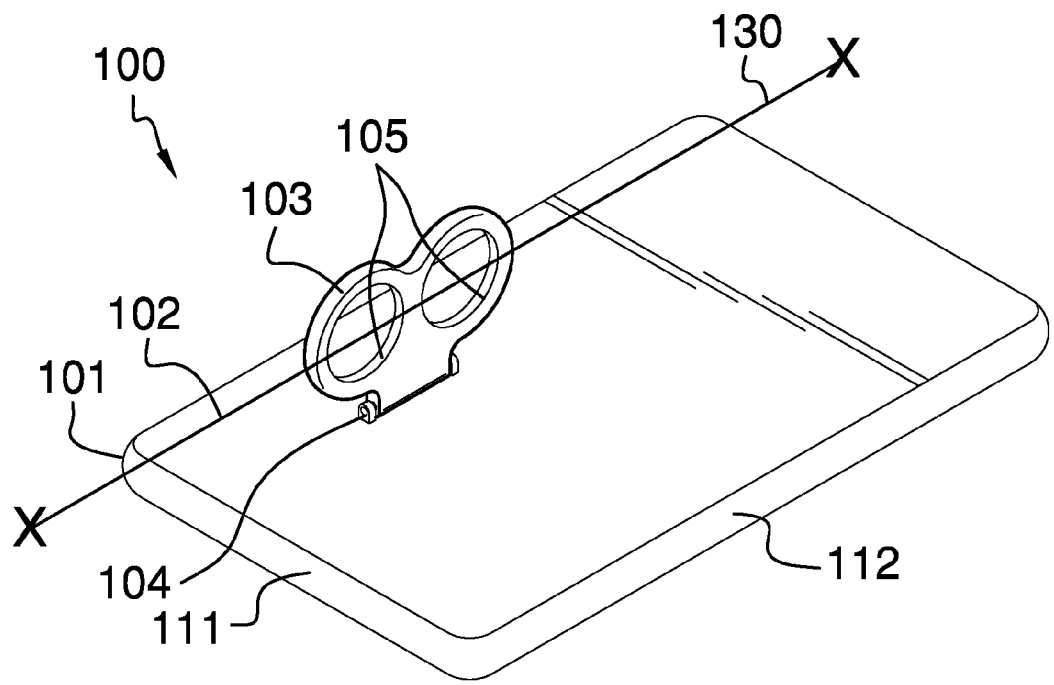
FIG. 1 is a perspective view of an embodiment of the disclosure.
Figure 2:
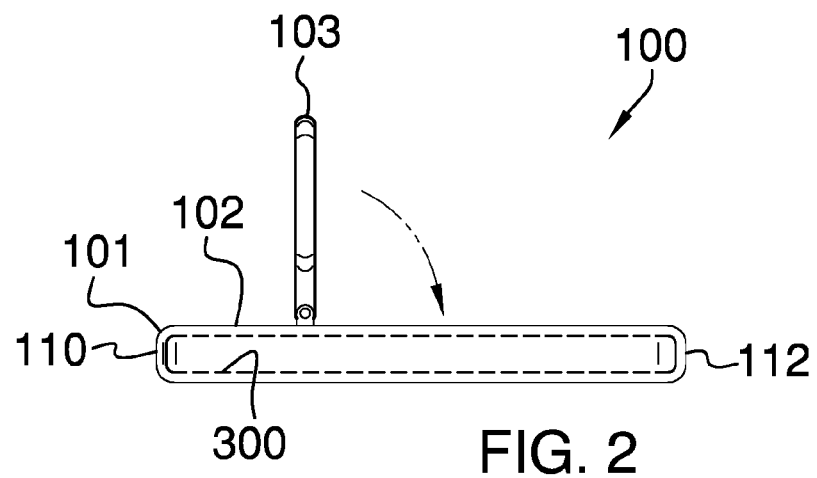
FIG. 2 is a side view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The smart phone or tablet computer case with finger-engaging slots 100 (hereinafter invention) comprises a case 101 that is adapted to store and support an electronic device 300. The term electronic device 300 is being used to loosely refer to a cell phone, smart phone, tablet computer, PDA, etc.

The case 101 is further defined with a rear surface 102. The rear surface 102 is generally planar or flat, and includes a pivoting armature 103 thereon. The pivoting armature 103 is able to rotate with respect to the rear surface 102 via a hinge 104. The hinge 104 enables the pivoting armature 103 to rotate from a flattened state against the rear surface 102 to a perpendicular position with respect to the rear surface 102.

The pivoting armature 103 is further defined with a pair of finger holes 105. The pair of finger holes 105 is each adapted to receive a finger 201 of a hand 200. The pivoting armature 103 is the component of the invention 100 that is adapted to secure the invention 100 to the hand 200 in order to prevent dropping of both the invention 100 and applicable electronic device 200. The pair of finger holes 105 are linearly aligned on the pivoting armature 103. The pivoting armature 103 is a planar-shaped item, and can be rotated to a flattened position with the rear surface 102 so as to minimize the protuberance of the overall invention 100.

Figure 3:
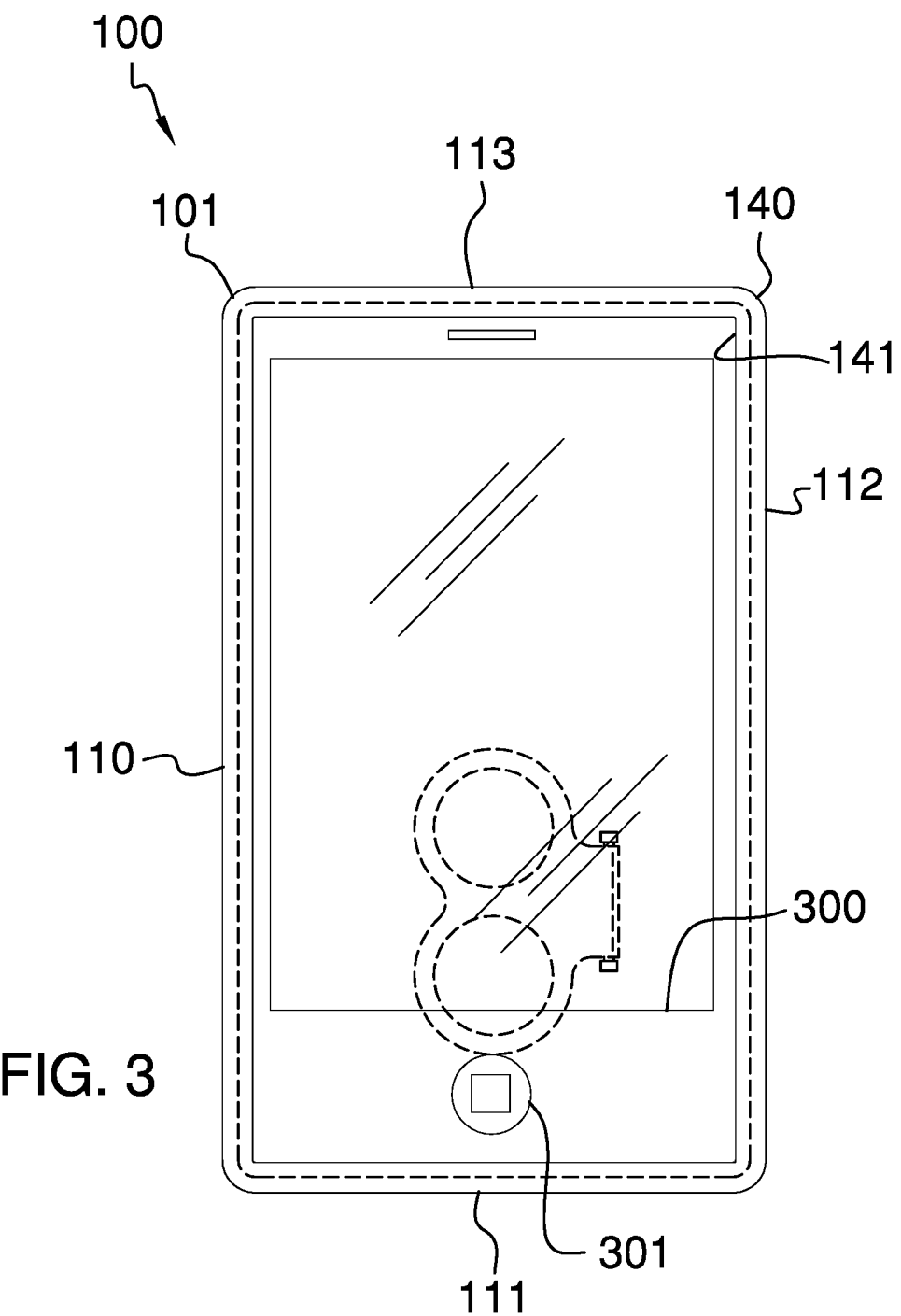
FIG. 3 is a top view of an embodiment of the disclosure in use.
Figure 4:
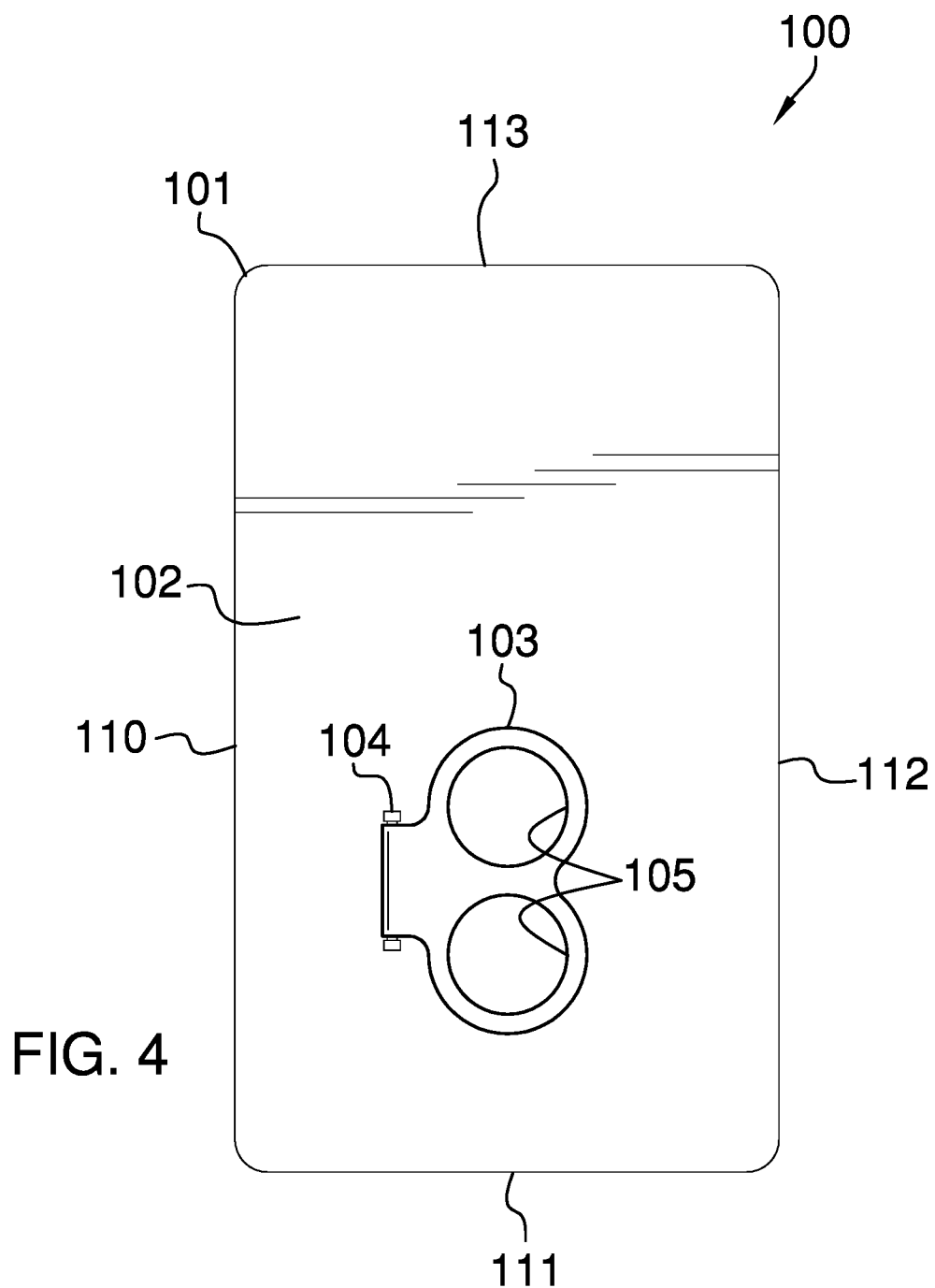
FIG. 4 is a rear view of an embodiment of the disclosure.
Figure 5:
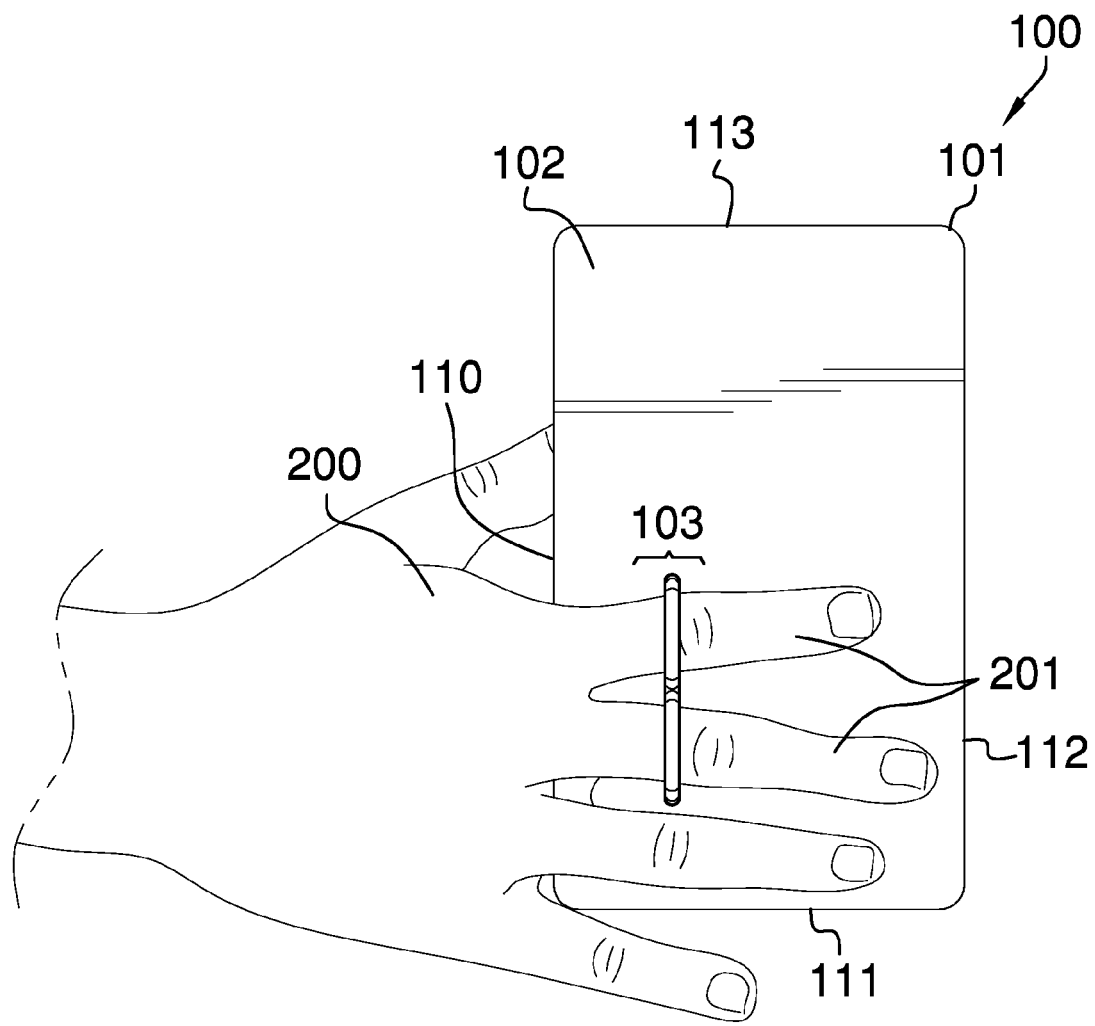
FIG. 5 is a rear view of an embodiment of the disclosure in use.

Referring to FIG. 4, the pivoting armature 103 is not centrally aligned along the rear surface 102. In fact, the pivoting armature 103 is adjacent to a first edge 110 and a second edge 111. The pivoting armature 103 is parallel with the first edge 110 as well as a third edge 112. The pivoting armature 103 is off-centered with respect to the rear surface in order to accommodate the fingers 201 of the hand 200. The second edge 111 and a fourth edge 113 are perpendicular with respect to the pivoting armature 103. The pivoting armature 103 is closer to the second edge 111 than the fourth edge 113. Referring to FIG. 3, the pivoting armature 103 is closer towards a bottom half of the electronic device 300 where a home button 301 is provided.

The invention 100 may be made of a plurality of materials comprising a plastic, rubber, wood, metal, carbon fiber composite, etc. It shall be noted that the pivoting armature 103 is able to rotate at least 90 degrees from a flattened state to a perpendicular position (see FIG. 2). The pair of finger holes 105 are linearly aligned with one another, and extend across a hole line 130 that is parallel with the first edge 110 and the third edge 112. The case 101 may be further defined with a front surface 140 with an opening 141 that enables the electronic device 300 to be inserted and removed as needed.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An accessory for carrying an electronic device comprising:
   a case with a pivoting armature rotatably engaged on a rear surface of said case;
   wherein the pivoting armature includes a pair of finger holes that are each adapted to receive a finger so as to adaptively secure said case to a respective hand;
   wherein the case is adapted to receive an electronic device;
   wherein the rear surface is generally planar;
   wherein the pivoting armature is able to rotate with respect to the rear surface via a hinge;
   wherein the hinge enables the pivoting armature to rotate from a flattened state against the rear surface to a perpendicular position with respect to the rear surface;
   wherein the pair of finger holes are linearly aligned on the pivoting armature;
   wherein the pivoting armature is a planar-shaped item, and can be rotated to a flattened position with the rear surface;
   wherein the pivoting armature is not centrally aligned along the rear surface;
   wherein the pivoting armature is adjacent to a first edge and a second edge.

2. The accessory according to claim 1 wherein the pivoting armature is parallel with the first edge as well as a third edge.

3. The accessory according to claim 2 wherein the pivoting armature is off-centered with respect to the rear surface in order to adaptively accommodate the fingers of the hand.

4. The accessory according to claim 3 wherein the second edge and a fourth edge are perpendicular with respect to the pivoting armature; wherein the pivoting armature is closer to the second edge than the fourth edge; wherein the pivoting armature is adapted to be closer towards a bottom half of the electronic device where a home button is provided.

5. The accessory according to claim 4 wherein the pivoting armature is able to rotate at least 90 degrees from a flattened state to a perpendicular position.

6. The accessory according to claim 5 wherein the pair of finger holes are linearly aligned with one another, and extend across a hole line that is parallel with the first edge and the third edge.

7. The accessory according to claim 6 wherein the case is further defined with a front surface with an opening that enables the electronic device to be inserted and removed as needed.

* * * * *